United States Patent
Adler et al.

(10) Patent No.: US 9,910,667 B2
(45) Date of Patent: *Mar. 6, 2018

(54) SEGREGATING A MONOLITHIC COMPUTING SYSTEM INTO MULTIPLE ATTACHABLE APPLICATION CONTAINERS BASED ON APPLICATION BOUNDARIES

(71) Applicant: VMware, Inc., Palo Alto, CA (US)

(72) Inventors: Nir Adler, Netanya (IL); Dima Golbert, Beit Shemesh (IL); Or Lupovitz, Rishon le Zion (IL); Kosta Shougaev, Rehovot (IL)

(73) Assignee: VMware, Inc., Palo Alto, CA (US)

( * ) Notice: Subject to any disclaimer, the term of this patent is extended or adjusted under 35 U.S.C. 154(b) by 8 days.

This patent is subject to a terminal disclaimer.

(21) Appl. No.: 15/186,242

(22) Filed: Jun. 17, 2016

(65) Prior Publication Data

US 2017/0364353 A1    Dec. 21, 2017

(51) Int. Cl.
*G06F 9/44* (2018.01)
*G06F 9/445* (2018.01)

(52) U.S. Cl.
CPC . *G06F 8/70* (2013.01); *G06F 8/65* (2013.01)

(58) Field of Classification Search
CPC ............................................. G06F 8/70
USPC ............................................. 717/168
See application file for complete search history.

(56) References Cited

U.S. PATENT DOCUMENTS

| | | | |
|---|---|---|---|
| 8,930,886 B2 * | 1/2015 | Dunker | G06F 8/75 717/104 |
| 2008/0077711 A1 * | 3/2008 | Cepulis | G06F 9/4406 709/250 |
| 2010/0106885 A1 | 4/2010 | Gao | |
| 2012/0304168 A1 * | 11/2012 | Raj Seeniraj | G06F 9/4445 718/1 |
| 2014/0137125 A1 | 5/2014 | Hsu | |

* cited by examiner

*Primary Examiner* — Lanny Ung

(57) ABSTRACT

Techniques are described for segregating a monolithic computing device that contains many installed applications into separate application storage volumes that can be attached or detached from the computing device as needed. Once the monolithic device has been segregated, the application storage volumes can be managed remotely from a management server and can be enabled or disabled on the device based on instructions from an administrator. Additionally, the administrator is enabled to select which application storage volumes are migrated during an operating system (OS) upgrade on the computing device.

18 Claims, 7 Drawing Sheets

SEGREGATING A MONOLITHIC COMPUTING SYSTEM INTO MULTIPLE ATTACHABLE APPLICATION CONTAINERS BASED ON APPLICATION BOUNDARIES

RELATED APPLICATIONS

This application is related to U.S. patent application Ser. No. 15/186,251, entitled "SELECTIVELY MIGRATING APPLICATIONS DURING AN OPERATING SYSTEM UPGRADE" by Nir Adler et al., filed on the same date as the present application, which is incorporated by reference in its entirety herein.

TECHNICAL FIELD

The present disclosure generally relates to application management on computing devices and more particularly relates to performing a static analysis of a computing device to create attachable application storage volumes for the applications installed on the device.

BACKGROUND

Information Technology (IT) management has become an increasingly complex task for a large organization. There may be thousands of users (e.g. employees) carrying their own individual endpoint devices (e.g. laptops, workstations, smart phones, tablet computers, etc.) and each device may have an abundance of software and applications that are operating on the device. Some of these applications are unique to each individual user, while others are identical across several devices or at least share some of the same components (e.g. files, registry entries, data). Users generally want the freedom to install whatever software and applications they choose while IT departments are faced with the need to maintain compliance and data protection across this complex ecosystem. For example, a typical IT department today needs to be able to manage, secure and deliver applications to users, distribute software updates, as well as be able to back up and restore any user's data and settings on demand. One particular requirement for managing applications on such a large scale is being able to remotely add or remove applications on an individual computing device from a central location and to do so across numerous devices.

There exist a number of software solutions, sometimes referred to as "application capture" systems that attempt to aid organizations in creating application packages. For example, the System Center Configuration Manager (SCCM) available from Microsoft Corporation; the LANDESK Management Suite (LDMS) available from LANDESK Software; and the Client Management Suite (CMS) available from Symantec Corporation; all take different approaches in assisting an IT administrator in application management, including in some cases providing an application package that could be delivered to end user devices. Such conventional solutions for the capture, delivery and management of applications often leverage recording technologies during the application installation. This generally means that each application must first be installed separately on a dedicated clean staging machine, which could be a virtual machine or a physical computer. For example, one type of process for capturing an application first records the state of the system on the staging machine prior to installing an application (i.e. captures a pre-installation snapshot) and then records the state of the system again after the application has been installed (i.e. captures a post-installation snapshot). Based on comparing the pre-installation snapshot and post-installation snapshot, the system is able to compute a delta that indicates which files and registry entries were added, removed, and modified during the installation process. This delta can presumably then be used to determine which components (files, registry entries, etc.) actually comprise the application so that a package containing those components can be created. Such a package can then be delivered to multiple endpoint devices from a central location by the administrator, where it can be merged onto each endpoint device.

However, the type of process mentioned above suffers from a number of shortcomings. One limitation of such conventional application capture systems is that they typically require a recording of the pre-installation state, which is not always available. For example, many applications are installed on endpoint devices by the users themselves, who frequently obtain the application from third party sources. While the IT department would like to be able to manage such applications, it may not have the version of the application available to be able create an application package for it. Another inherent difficulty in trying to create an application package using conventional capture systems stems from the large numbers of users, devices and types of software that are involved. Organizations may reach inventories with thousands or even tens of thousands of applications, each of which would require a significant investment in time and resources to capture if a conventional capture process were to be used for each individual application. Many organizations are intimidated by the amount of work and resources they will need to invest in order to start managing the applications. At the same time, those which are willing to perform all the required manual work to capture applications soon find out that this is an on-going never-ending process, since for every new version of an application the administrator needs to re-capture the application and repeat the process.

Another source of inefficiency stems from the tight coupling between the operating system (OS) and the applications installed on the endpoint computing device. With conventional application installations, the files and registry entries that are needed by the application are added to various locations, without any clear delineation of which components comprise which application. Thereafter, to remove an application, an uninstall process needs to be followed to ensure that all of the previously added components are removed from all the various locations. This makes adding and removing applications on a computing device difficult in some cases, especially when doing so remotely, without user input. Additional difficulties arise when the IT department wishes to migrate some or all of the endpoint devices to a new version of the operating system (OS). If the IT department has many versions of applications for the previous OS, an administrator would either need to ensure that all of those managed applications are compatible with the new version of the OS or create new versions of the managed applications for the new OS. Moreover, the applications would need to be somehow migrated or re-deployed onto the endpoint devices. With certain operating systems, the upgrade process of the OS may try to preserve the applications that are already present on the device. However, this is usually performed without regard to whether the application is a user-installed application or an application managed by the IT department and the applications are preserved automatically, without enabling the user to select which applications he/she may wish to migrate and which can be discarded during the migration. In light of all of these shortcomings, more efficient and robust system is needed for managing applications on user endpoint devices.

DETAILED DESCRIPTION

Figure 1:
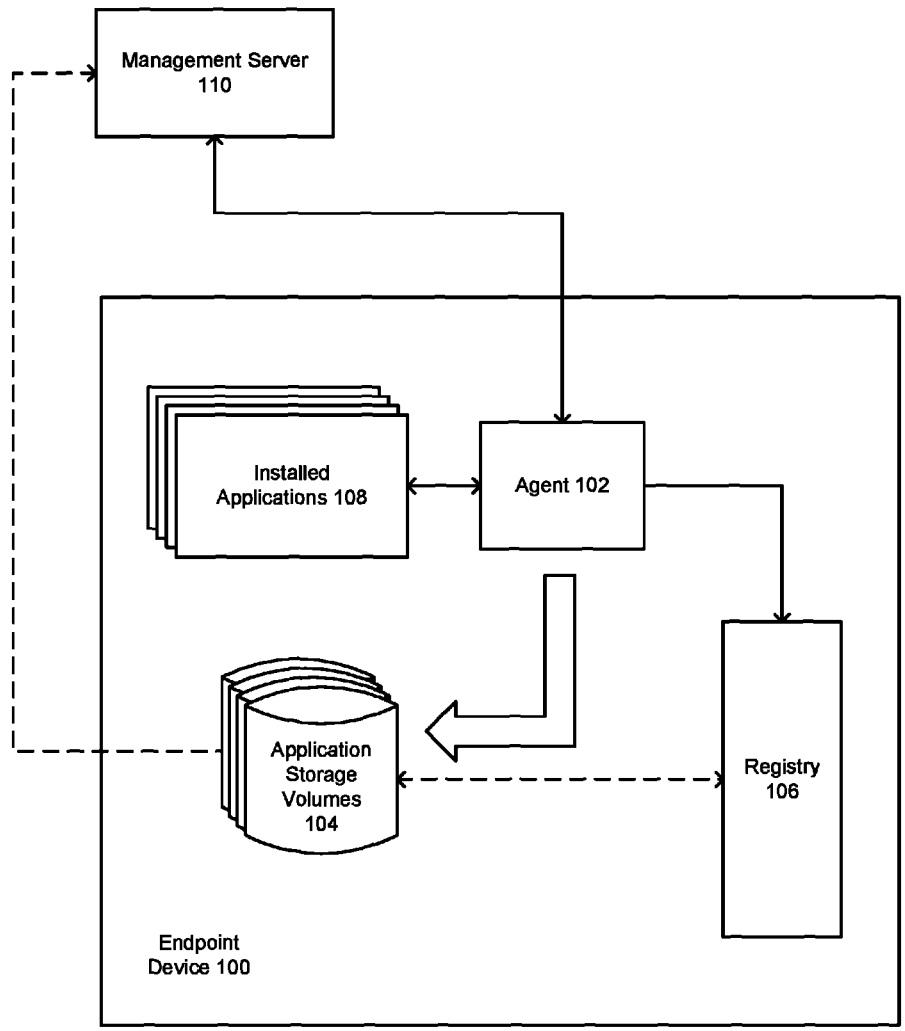
FIG. 1 illustrates an example of segregating a monolithic computing system into multiple attachable application volumes, in accordance with various embodiments.

Systems and methods in accordance with various embodiments of the present disclosure overcome at least some of the above mentioned shortcomings and deficiencies by enabling techniques for segregating a monolithic computing device that contains many conventionally installed applications into separate dedicated containers or application storage volumes for each of those applications, where the containers can subsequently be attached or detached from the computing device as needed. Once the monolithic device has been segregated in such a manner, the application storage volumes can be managed remotely from a management server and can be enabled or disabled on the device based on instructions from an administrator. Additionally, the embodiments described herein enable the administrator to select which application storage volumes are migrated during an operating system (OS) upgrade on the computing device.

To begin the process of segregating the applications, an agent can be downloaded and installed on the monolithic computing device. The agent is responsible for performing a static analysis of the computing device and determining the application boundaries between the applications installed thereon. That is, the agent is configured to use a number of techniques to scan the system on the computing device and identify all of the components that comprise each individual application. The agent can then generate a dedicated application storage volume, such as a virtual disk, for each application installed on the device. The virtual disk contains all of the necessary components that are needed to execute the application on the computing device. In some embodiments, a single application storage volume may contain the components for multiple applications. In this manner, for each application that has been installed on the computing device, there is a corresponding application storage volume that is generated.

To perform the static analysis, the agent begins by inspecting the installation database (e.g., add/remove registry database) on an endpoint computing device to determine a set of basic components of each application installed on the endpoint computing device. The set of basic components of an application includes a number of resources, including one or more binary files which are capable of execution. These binary files are scanned to identify any character strings inside each binary file that indicate a file system path, a registry path, a file name or an imported module. The components identified by the character strings (folders on the file system path, registry, file, module etc.) are also captured by the agent and added to the application storage volume. The agent can further scan a component object model (COM) database on the endpoint device to identify any references to files that were previously captured (i.e. during inspection of the installation database or identified by the character strings in the binary files). For any records of the COM database that contain such references to previously captured files, the entire COM record is collected. In addition, the agent may scan the shell extension references in the registry, looking to identify any shell extensions that are based on the files that were previously captured. If any such shell extensions are found, they are collected as well. Furthermore, the agent collects all of the file type associations on the endpoint device so that the application storage volume includes the associations of file type extensions with the application. Finally, the agent scans all shortcuts on the desktop and the start menu on the endpoint device in order to identify any shortcuts that reference the previously captured files. These shortcuts will also be collected and placed into the application storage volume.

Once the application storage volumes have been created for the applications, the components of each application can be deleted from the original locations on the system in which they were stored during the installation process. The application storage volume can then be attached to enable the application(s) of that container on the computing device. For example, to attach the application storage volume, the agent may mount the virtual disk containing the application components and modify the registry entries on the operating system to make the application executable directly from the virtual disk.

The process of removing the files and other components from the original locations and placing them in dedicated application storage volumes effectively decouples the applications that were installed on the device from being tightly integrated with the operating system. Once the tight integration has been removed in such a manner, the application storage volumes can be easily attached or detached, thereby enabling or disabling the applications on the device as needed. Furthermore, the application storage volumes can be uploaded by the agent to a remote management server over a network connection, which in turn enables the administrator to distribute the application storage volumes to other endpoint devices, where they can also be attached and detached.

At the end of the process of segregating the device, each application that was previously installed on the device is removed from the device and is stored in its own dedicated application storage volume (e.g., virtual disk such as VHD or VMDK). The application storage volumes are attached so that the device still has the applications, however after the segregation process, the application storage volumes can be managed remotely from a management server as separate containers. For example, the administrator can log into the management server and can remotely enable or disable applications on the device, wherein the management server communicates with the agent on the device to mount or unmount the virtual disk corresponding to the application as needed.

In various embodiments, the static analysis and segregation into application containers can also enable an improved operating system migration or upgrade process on the computing device. In particular, the segregation of the applications from the OS taught herein enables an administrator to select which applications should be migrated to the new version of the operating system during OS migration. During the OS migration on the device, the static analysis is first used to determine the application boundaries for all applications installed on the device (on old version of the OS). For each application, the static analysis identifies all of the components that comprise the application and creates an application storage volume for those components, as previously described. When a request is received to update the OS on the device, the agent can display a listing of all applications currently installed on the device to the user or administrator. The user or administrator can select which applications should be migrated to the new OS. Based on the input, an application storage volume is generated for each of those applications to be migrated. The components of the application are stored in the application storage volume (e.g., virtual disk) and the application storage volume is placed in a designated location. In some embodiments, the application storage volumes are stored locally on the device, while in other embodiments, the application storage volumes may be uploaded by the agent to a remote location over the network.

Once the application storage volumes have been created for the selected applications, the operating system on the computing device can be updated. In one embodiment, the update process replaces the OS with a newer version of the OS, such as in the case of migrating the device from Windows 8 to Windows 10. In another embodiment, the new OS is a different OS from the previous OS. Once the OS update is complete, the agent attaches each of the application storage volumes containing the previously selected applications on the new version of the OS. For example, the agent can mount each virtual disk containing the application components of each selected application on the new version of the OS and modify the registry entries on the new OS to make the application executable from the virtual disk. The applications that were not selected by the user or administrator can be deleted such that they are not migrated to the new version of the OS. In this manner, the user is provided with an effectively "fresh" device with only those applications which the user is still interested in.

FIG. 1 illustrates an example of segregating a monolithic computing system into multiple attachable application volumes, in accordance with various embodiments. The agent 102 is operating on an endpoint computing device 100 and the agent 102 uses a static analysis of the system to analyze the individual device for all applications 108 that have been installed on it. For each installed application 108, the agent finds the application boundary—i.e. it identifies all of the components that comprise the application. The process of performing the static analysis is described in more detail with reference to FIGS. 2, 5 and 6 throughout this disclosure. Once the agent has identified all of the components of an application, the agent 102 creates an application storage volume 104 for each application, which contains all of those components. In some embodiments, the application storage volume 104 is a virtual disk, such as a virtual hard disk (VHD) or a virtual machine hard disk (VMDK), containing each of the identified components of the application. In some cases, a single application storage volume can contain several applications, while in other cases, there is a separate application storage volume for each individual application.

Once the application storage volume is created for each application and contains all of the components of the application, the agent can remove the components from their original locations in which they were stored during the initial installation process. The application storage volume is then attached to the endpoint computing device 100 to make the application available on the device. In one embodiment, the application storage volume can be attached by mounting the virtual disk (e.g., VHD, VMDK, etc.) to the computing system and modifying one or more registry keys in the registry 106 on the operating system to make the application executable from the mounted virtual disk. This effectively replaces each original installed application on the device with a containerized application that is executable from the application storage volume. In some embodiments, the application storage volumes may also be uploaded to a remote management server 110 over a network connection, such as a Wide Area Network (WAN) connection or a Local Area Network (LAN) connection. The management server 110 can utilize those application storage volumes, such as by distributing them to other managed endpoint devices, where the application storage volumes can be attached or detached as needed to add the applications to those devices.

Conventionally, when applications are installed on a computing device, the applications become an integral part of the operating system or, stated differently, the computing system is "monolithic", meaning that there exists no clear separation between the applications installed on the OS and the OS itself. The components of any individual application may be located throughout numerous locations in the operating system, typically without regard to whether those locations also contain components of other applications and the like. A specific install process would traditionally be necessary to add all of the components of the application to various locations in the operating system and similarly, a specific uninstall process would be necessary to remove the components of the application from those locations. The embodiments, described herein aim to avoid this tight coupling between the application and the OS, and transform already installed applications into container-based application storage volumes (also referred to as "application stacks" or "application containers") which can be attached/detached to and from the OS at any time. These application storage volumes are not the native part of the operating system anymore in the same way that the previously installed versions of the application were. The applications are effectively detached from the OS since they are contained in their own containers which are not part of the OS, which allows an administrator to enable/disable them, etc. Once the applications have been separated in this way, they are still able to get resources from the OS, but they are no longer an integral part of the OS. For example, if the user tries to find the applications in their original locations after the segregation process, the components of those applications will not be found in those locations anymore since the components have been moved into the separate containers (application storage volumes).

One particularly useful aspect of segregating the monolithic computing device into several application storage volumes in this manner manifests itself during a transition of the device to a new operating system. If the applications are segregated from the tight integration with the OS in this manner, the process of updating an OS on the endpoint device can focus on replacing only the OS-specific files and once that is completed, the application storage volumes can be attached to make the previous applications available on the new OS. This process can be selective—e.g. the administrator may select which applications they wish to keep and make available on the new version of the OS and which ones can be discarded. The selective aspect of this process is advantageous—the device does not have to migrate all the previously installed applications; rather the user can choose which ones to take with them to the new version of the OS. As such, this OS migration process provides additional capabilities to the administrator that conventional migration solutions do not provide.

Traditionally, migrating a device to a new OS in the past meant that the previously installed applications would no longer be available on the new version of the OS. More recently, some OS migration processes available from certain OS providers have attempted to allow users to retain the previously installed applications and allow them to be used on the new version of the OS. For example, with some migration solutions, all the OS files are replaced with the new version of the OS files. The process works by calculating the delta of the files which are known to be related to the old OS and then only moving the files independent of the old OS to the new OS. This means that all of the previous components previously installed are still there, however the user gets no ability to choose which components to migrate during the OS migration. The embodiments described herein enable the administrator to select which applications to migrate to the new OS and which applications to discard, such that the user can end the OS migration process with a "fresh" device that only has those applications which they still find useful, all without having to perform any cumbersome uninstall process for each application that is not wanted.

When a request to migrate the computing device to a new OS is received, the agent 102 can perform a static analysis of the computing device to determine the application boundaries, as previously described. This process identifies all of components that comprise each of the applications already installed on the device. The agent can then display to the user (e.g., administrator) a listing of all currently installed applications on the device. The user can use this listing to select which applications should be migrated to the new version of the OS, with the remaining applications being discarded (deleted) from the device. Once the user provides the input selecting the applications, the agent can generate an application storage volume for each selected application, using the processes previously described. For example, the agent may generate a VHD containing all of the components identified during the static analysis process. The VHD can then be stored in a designated location either locally or uploaded to a remote location.

Once the VHDs have been created for each selected application, the device can be migrated to a new OS. In some embodiments, the OS is a newer version of the OS, while in other embodiments, the new OS may be an entirely different OS. Once the process of updating the OS has completed, the agent can attach the previously created application storage volumes by mounting each created VHD on the new OS and modifying the appropriate registry entries on the new OS to make the selected application executable from the mounted VHD. If the application storage volumes were uploaded to the management server, then the agent can download them again from the server over the network prior to attaching them on the device. The components can be deleted from original locations on the computing device in which the components were installed during installation on the previous OS. Similarly, any applications that were not selected by the administrator can be deleted from the computing device and not available on the new OS.

As previously described, an application can be enabled on the computing device by dynamically attaching the application storage volume to the computing device. In one embodiment, the application storage volume can be attached by mounting the virtual hard disk containing the application to the computing system and modifying the registry keys, file paths and other information to make the application appear as though it has been locally installed. Alternatively, the act of attaching the application volume may involve mapping or otherwise making available the application volume to the computing system. For example, the volume containing the application may be mapped and registry settings changed to direct future calls of that file type to the application stored in the virtual hard disk. In those embodiments, where the application storage volume has been uploaded to a management server 110, the act of attaching the application storage volume may involve the agent 102 communicating with the management server by accessing the server's Application Programming Interface (API). For example, in some cases, the agent 102 may receive instructions from the management server 110 to attach the application storage volume to the endpoint device or detach the application storage volume from the endpoint device.

Such an application storage volume may include the files representative of the application or in some cases of an update to the application. Rather than having to download, extract, and write these files to disk, the application storage volume can be attached by mounting the volume and overlaying the contents, such as files and directories, with respect to their local counterparts.

Mounting an application storage volume may be accomplished by associating the name of the volume with an access path to the volume. Once mounted, the application files, directories, and other application elements may be overlaid within the file system of the endpoint device in order to provide the user with access to the application without going through the traditional installation process. Overlaying may be accomplished by editing the file system to redirect requests to the components on the newly-mounted volume (e.g., virtual disk), rather than pointing to their local counterpart components that were previously installed in the original installation locations and subsequently removed.

In some implementations, the application storage volumes may be managed by an administrator or some other management service that provides various versions of applications to one or more end users. These volumes contain the applications that were previously installed on the device, including files and directories that have been extracted from the device and stored in the virtual hard disk.

In some embodiments, the application storage volume is a virtual disk, as available for example in the virtual machine hard disk (VMDK) format or the virtual hard disk (VHD) format. In alternative embodiments, the application storage volume may take a different form, such as hard disk partitions, flash memory portions, or other virtual or non-virtual storage locations.

In some embodiments, the application storage volume can also be detached from the computing device, thereby disabling the application on the computing device. The process of detaching the application volume may include un-mounting the virtual disk from the computing device, or preventing the computing device from accessing the virtual disk and the corresponding components. If the original components of the application have not been deleted from the original locations, detaching may also include editing the file system of the computing device to redirect requests from locations in the virtual disk to the original locations in which the components reside.

Further details regarding the process of attaching and detaching the application volumes and other information related thereto can be found in U.S. patent application Ser. No. 14/644,971 entitled "DYNAMIC UPDATING OF OPERATING SYSTEMS AND APPLICATIONS USING VOLUME ATTACHMENT" by inventors Harpreet Singh Labana et al. filed on Mar. 11, 2015, the contents of which is incorporated by reference herein in its entirety.

Figure 2:
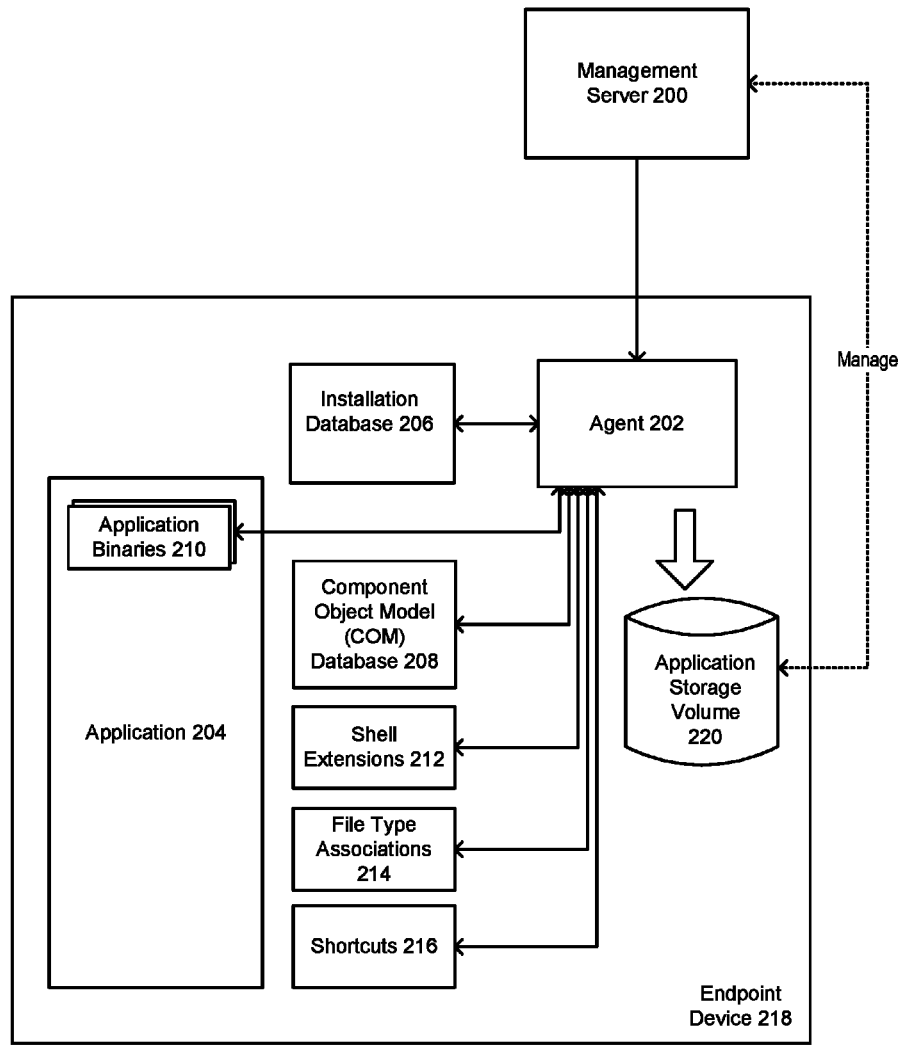
FIG. 2 illustrates an example of a system during a static analysis being performed to identify the components of a single application on the device, in accordance with various embodiments.

FIG. 2 illustrates an example of a system during a static analysis being performed to identify the components of a single application on the device, in accordance with various embodiments. As illustrated, an agent 202 can be downloaded and installed on each endpoint device 218 that is to be managed. In one embodiment, the agent 202 can be downloaded from a remote management server 200. The management server 200 may provide a console for the administrator of the IT department or other user, which can be used to remotely manage applications on endpoint devices. Once the agent has been downloaded on an endpoint device 218, it can perform a static analysis of the computing system to identify the application boundaries of the individual applications on the device. In one embodiment, the management agent 202 transparently runs in the background of an existing end-user's desktop and uses several techniques to capture the applications that have been installed by the end-user. To capture an application, the management agent performs a static analysis of the Windows operating system (OS), including registry and file system, in order to detect the presence of the presence of the application 204. The static analysis spans several steps, as discussed below.

In various embodiments, after being installed on the endpoint device, the management agent 202 first scans the installation database 206 on the system. The installation database 206 is located in the registry of the endpoint machine 218. For example, in the Windows operating system, the installation database is what allows the conventional Add/Remove programs widow to be displayed that a user can see, which lists all programs installed on the endpoint device, which the user can select to un-install. Based on scanning the installation database 206, the agent is able to determine which applications are installed on the endpoint computing device. In some embodiments, the agent 202 may present the user with a choice of which applications the user would like to capture.

Once an application to capture is determined, the agent 202 can scan the registry on the endpoint device. In the example where the OS is Microsoft Windows, the registry is a hierarchical database that stores low level settings for the OS and for applications that opt to use the registry. The kernel, device drivers, services, Security Accounts Manager (SAM) and user interface call use the registry. The Windows registry also allows access to counters for profiling system performance. From scanning the registry, the agent 202 is able to determine where the main application is installed—for example, the application may point from the registry to an entire folder. Alternatively, it might point to a single file or several files. The process of capturing the application begins there.

In various embodiments, the agent 202 uses several heuristics to capture either files or entire folders for applications. For example, the agent 202 may start with scanning the uninstall database to see all of the un-installable applications, then once the information about these applications is collected, the agent 102 can go to other places in the Operating System (OS) which have more information about each installed application. The uninstall database thus provides a starting point of where to look for the initial application components. The uninstall database typically contains registry key for each application and the registry key contains information about the application name, the application publisher, the command that would be invoked to uninstall the application, and the like. Some information may not be located in the uninstall database. For example, in the Windows OS, the icon of the application would not be located in the uninstall database. Thus, to determine the icon of the application, the agent 202 may look at other registry keys. All of these areas are referred to as the installation database 206 as shown in FIG. 2. In various embodiments, the agent utilizes some pre-coded heuristics to capture either files or entire folders based on the initial components determined from the installation database 206. These files and folders are added to the application storage volume 220. In one embodiment, the capture is performed by creating a folder which will serve as a mount point for the application storage volume 220 (e.g., VHD file). The agent 202 then starts bringing all the files/folders into that folder (e.g. by copying the files into that folder).

Once the agent 202 has captured the initial application components based on scanning the installation database 206, it scans the actual captured portable executable (PE) files 210 of the application (e.g. executables and DLLs) to search for strings that resemble paths (registry or file paths). The agent then collects the files or folders pointed to by those strings as well. For example, if an application needs to open a particular file (e.g. a log file or system 32 file) the path of that file will usually be hardcoded in the code of the binary executable file 210. The agent 202 is able to scan the code of the binary executable file 210, identify the file path in the binary and then add the file indicated by that file path to the captured application package (i.e., copy it to the mount point for the VHD file). The code can be scanned by using the PE header of the binary executable file 210. For example, under the Windows OS, every DLL file is of the format is Portable Executable (PE), which is a standard format that is well documented. The agent 202 can use such documentation to skip directly to the correct portion of the file where all of the strings are located.

Both of the methods above work together to aid in the capture of the entirety of the application. In some situations, a single method alone would not yield all of the necessary components of the application and the other method can be used to supplement it. For example, the application may be installed in one folder, however the application may actually write to log files which are located in a different folder. While only inspecting the installation database would yield the main application components, there would not be any available information of where the application stores such log files. However, if the agent then scans the main components (binary executables), those components will contain the information for the file path to where those log files are written somewhere within the binary executable file. By scanning the binaries and collecting those files, the agent is able to bring those log files along with the rest of the application components.

Once the initial application components have been collected and the binary executable files parsed and files/folders pointed to by strings have been captured, the agent 202 can scan the component object model (COM) database 208. The agent scans the COM database 208 to determine whether the application utilizes any COM calls or COM interfaces. If the application does use such calls/interfaces, the agent 202 collects both the interface and the files associated with it.

COM is a binary interface standard provided by Microsoft Corporation, which allows inter-process communication—one process can call a function that is written in another file using this method. It allows transferring objects between several processes and components. So for everything that the agent 202 has collected up to this point (i.e., the components collected based on inspecting the installation database 206 and the components collected based on parsing the binary executable files 210), the agent checks to see if there are any references to any COM interface. If there are such references, the agent 202 collects them as well. This means collecting both registry and files. For example, if the COM database 208 points to a certain interface and a DLL file, the agent 202 will collect both the component in the registry and the DLL file itself from the file system. These will be included in the application storage volume as well by copying them to the folder serving as the mount point for the VHD file.

The agent 202 then collects shell extensions 212. Shell extensions 212 are used to by applications to extend the menu associated with the application. For example, when right clicking an application, a menu is frequently displayed with customized menu items that are specific to that application. The shell extensions 212 are used to extend the menu in this manner and to populate the menu with such additional menu items. By collecting the shell extensions, the agent 202 ensures that the application package will bring with it its own extended menu items which might be displayed by right clicking on its icon.

Next, the agent 202 scans the desktop, start menu and other user areas for shortcuts 216. If any such shortcuts point to the files the agent has already collected (based on scanning the installation database and binary executables), the agent collects those shortcuts as well.

In some embodiments, the agent 202 also collects file type associations 214 of the application. For example, if the user has Microsoft Office installed on the endpoint computer 218, it will be used to open files with the ".doc" and ".docx" extensions. This file type association information can be collected by the agent as well. This way, when the application storage volume is delivered to another endpoint device, the device will know to open those types of files with the new application.

Figure 3:
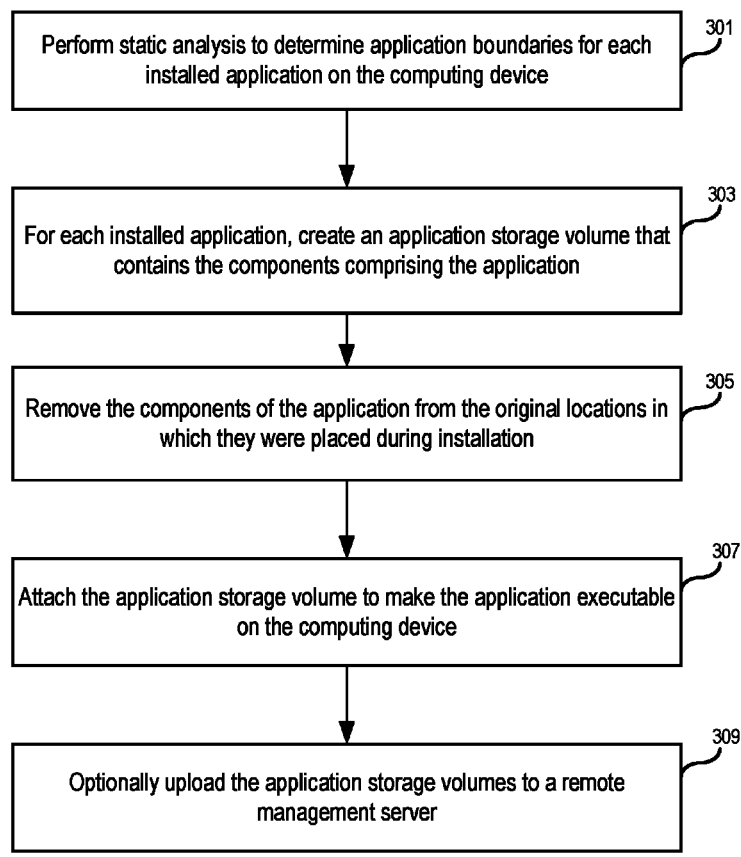
FIG. 3 illustrates an example of a process for segregating a monolithic computing system into multiple attachable application storage volumes, in accordance with various embodiments.

FIG. 3 illustrates an example of a process for segregating a monolithic computing system into multiple attachable application storage volumes, in accordance with various embodiments. As shown in operation 301, the process begins by an agent performing a static analysis on the monolithic device to determine the application boundaries for each application installed on the device (or some subset of the applications installed on the device). For each application, the agent creates an application storage volume that contains all of the components necessary to execute that application, as shown in operation 303. The application storage volume is thus self-contained in that it includes all of the necessary elements for execution of the application. Once the application storage volume is generated, the agent removes the components of the application from their original storage locations on the system, as shown in operation 305. These are the locations in which the components were originally placed as part of the application installation process. As such, after the process of segregating the applications of the monolithic device, the components of the application are no longer resident in their original locations and are instead placed in separate dedicated containers (i.e., application storage volumes).

In operation 307, the agent attaches the application storage location to the computing device in order to make the application available. In one embodiment, the agent mounts the VHD or VMDK containing all of the application components identified during the static analysis on the computing device and modifies any registry entries that are necessary in order to make the application executable from the mounted VHD or VMDK. In addition, the application storage volumes can be uploaded to a remote management server, as shown in operation 309. This can enable an administrator to distribute the application storage volumes to other endpoint devices.

Figure 4:
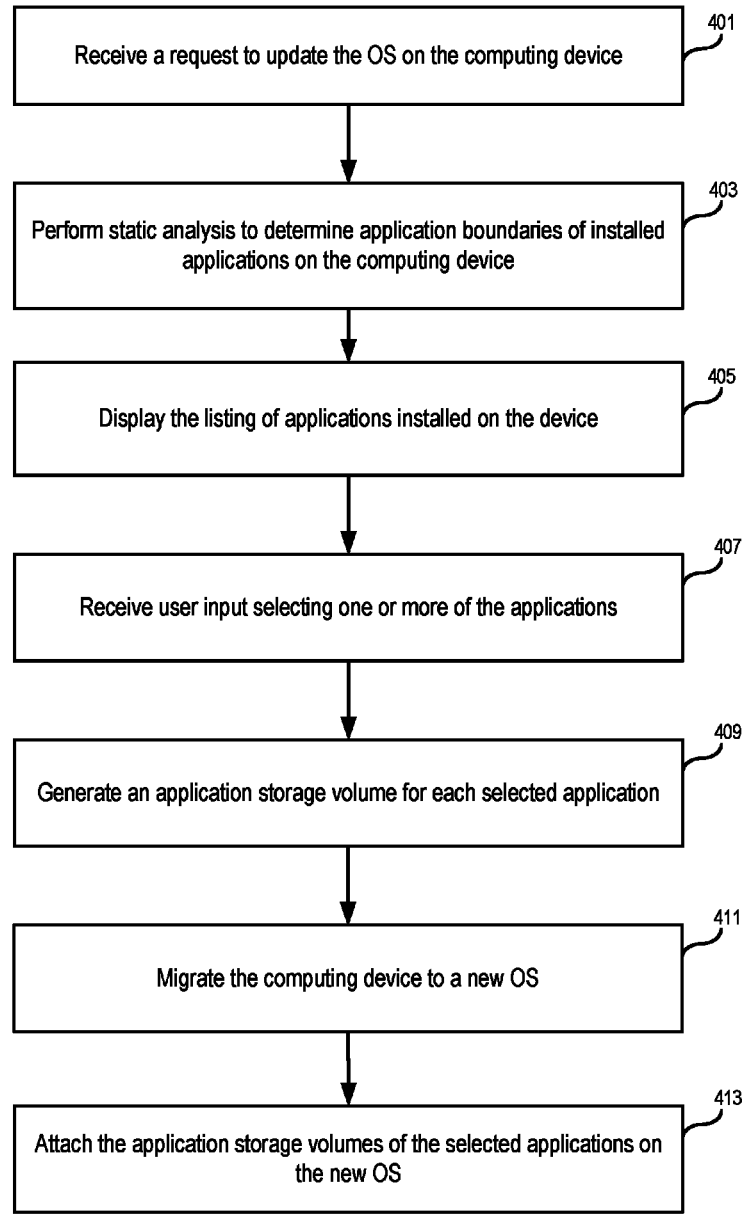
FIG. 4 illustrates an example of a process for selectively migrating applications during an operating system upgrade, in accordance with various embodiments.

FIG. 4 illustrates an example of a process for selectively migrating applications during an operating system upgrade, in accordance with various embodiments. As shown in operation 401, a request is received to update the operating system on the computing device. In some embodiments, the OS migration can be initiated by an administrator, in other cases, the OS migration can be performed by the individual end user. In operation 403, the agent performs a static analysis of the system to determine the application boundaries of the applications installed on the device. In operation 405, the listing of the applications which are identified is displayed to the user. The user provides input selecting one or more of the listed applications, which the user would like to migrate to the new version of the OS, as shown in operation 405. The other applications may be deleted during the OS migration process. In operation 409, the agent generates an application storage volume for each of the applications selected by the input provided in operation 407. In one embodiment, the application storage volume is a virtual disk containing all of the components of that application.

In operation 411, the device is migrated to the new version of the operating system. For example, the device may be upgraded from Windows 8 to Windows 10. Once the OS upgrade process is complete, the application storage volumes can be attached to the computing device on the new OS, as shown in operation 413. For example, the virtual disk containing the application may be mounted on the new OS and the registry entries on the new OS can be modified to make the application executable from the mounted application storage volume.

Figure 5:
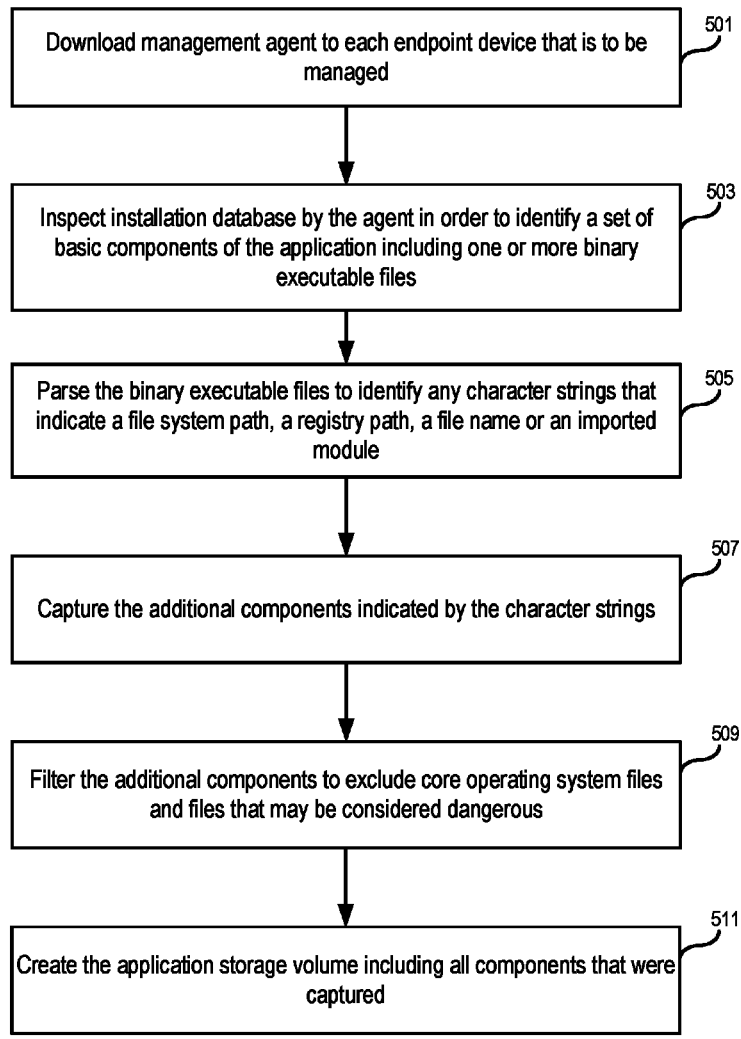
FIG. 5 illustrates an example of a process of performing the static analysis to capture application components of an installed application, in accordance with various embodiments.

FIG. 5 illustrates an example of a process of performing the static analysis to capture application components of an installed application, in accordance with various embodiments. As illustrated in operation 501, the process begins by downloading and installing an agent to each endpoint device that is to be managed. Once the agent is operating on the endpoint device, the agent first inspects installation database (e.g. add/remove registry) in order to identify a set of basic components of the application including one or more binary executable files, as shown in operation 503.

In operation 505, the agent analyzes any binary executable files found by inspecting the installation database and parses those binary executable files to identify any character strings that indicate a file system path, a registry path, a file name or an imported module. The components (e.g. files/folders) that are indicated in the binary executables are filtered to exclude core OS files and potentially dangerous files (operation 509) and the remaining components are captured. Based on the captured components, an application storage volume can be created, as shown in operation 511, and this application storage volume can be delivered to other endpoint devices where it can be executed. The static analysis runs in the background without the user having to perform any actions. The information collected allows the agent to encapsulate an application into a VHD file to be delivered from any one endpoint to other endpoints.

Figure 6:
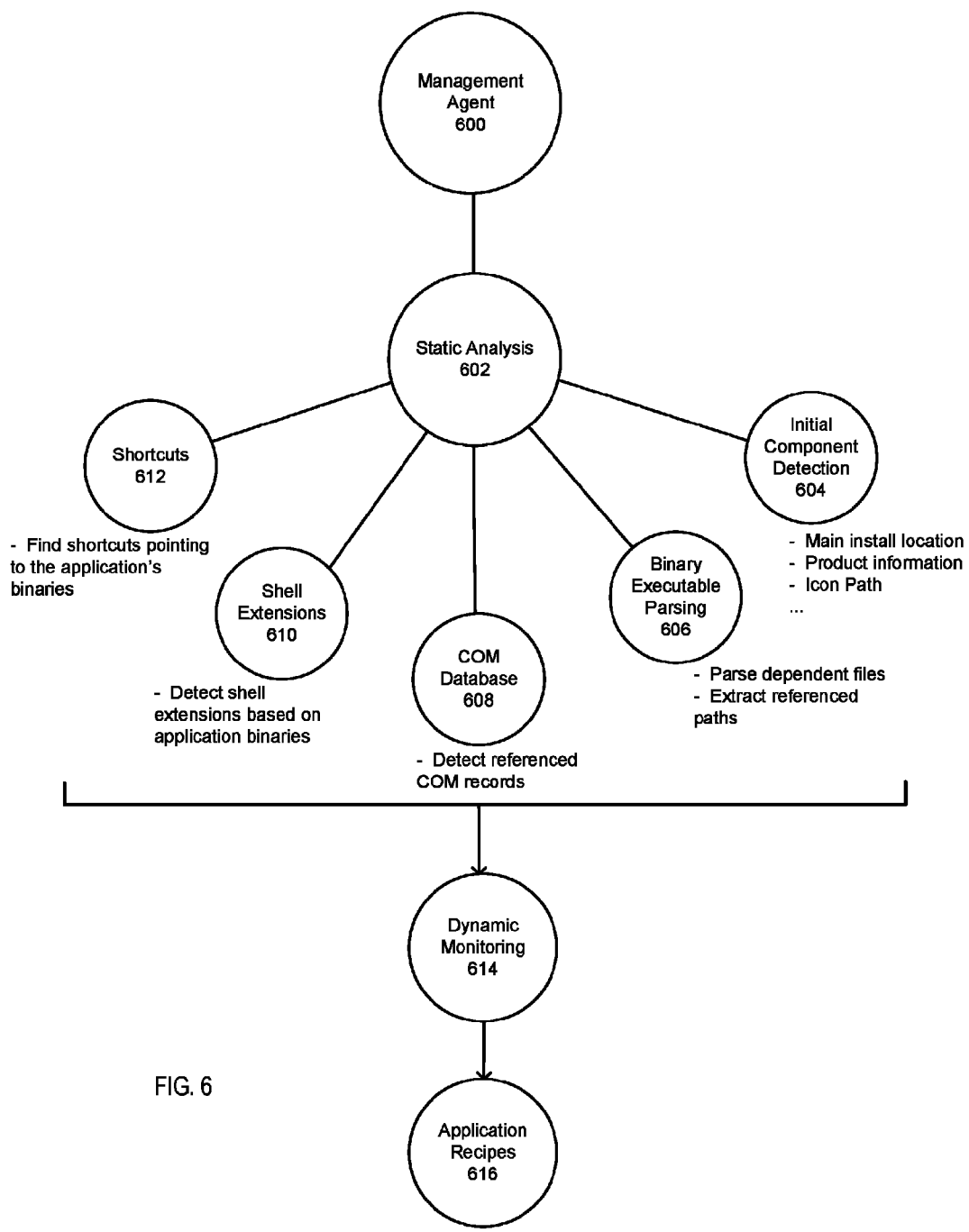
FIG. 6 illustrates an example of capturing applications using a static analysis and subsequently monitoring the application to capture any remaining components, in accordance with various embodiments.

FIG. 6 illustrates an example of capturing applications using a static analysis and subsequently monitoring the application to capture any remaining components, in accordance with various embodiments. As previously described, the static analysis 602 performed by the management agent 600 includes a number of different functions that all serve to capture a complete application storage volume, which can be deployed to other endpoint devices. Each of the functions are discussed in further detail below.

Initial Component Detection 604—The first step is parsing all the relevant information from the Add/Remove registry database(s). This information may include any of the following:
  a. Main install location
  b. Uninstall command
  c. Icon path
  d. Product ID (for MSI installer)
  e. Upgrade Code (for MSI Installer)
  f. Display Name
  g. Publisher, etc.

This information can be used to detect the basic components of the application. For example, the install location, uninstall command and icon may indicate the application files. For Microsoft Installer (MSI) installers, the MSI database in the registry will contain the different files system and registry components of the application. This information is used to collect the initial components.

The MSI database can be very useful for collecting the application components. The registration of where some of the application files and registry are located are used to collect the application components. Moreover, the MSI database can imply that a specific component is shared across multiple applications.

Some heuristics are added in this phase. For example, the MSI database may reference only a single file in a folder, while in actuality the entire folder is required. However, for every folder of the application, there should be at least one record in the MSI database. Therefore, when the MSI database points to a specific file in directory, we collect the entire folder (non-recursively). Several other heuristics can also be implemented to improve and stabilize the application capture. One heuristic may be that in order to ensure the protection of certain sensitive system areas, only single file collection is allowed in such predetermined areas. For example, if the application is pointing to the path "C:\Windows\System32\MyFile.dll", only this file will be collected, and not the entire folder. In other paths, the entire folder may be collected.

Binary Executable File Parsing 606—Once the basic application components have been collected, the management agent parses all of the binary executable files (e.g. EXE, DLL), searching for: (a) strings that indicate file system paths; (b) strings that indicate registry paths (c) strings that indicate filenames; and (d) imported modules. For strings that indicate such paths, the components referenced by those strings are also collected for inclusion in the application package. In some embodiments, if the strings found in the binary executable contain a file path to another executable, then that other executable can also be parsed, searching for strings that resemble file system paths, registry paths, file names and imported modules.

File system and registry paths can then be normalized and filtered. The result is that only the existing, non-dangerous paths are collected. For example, paths to sub-folders of the main application folder can be considered and collected. Suspected filenames are searched in several locations, such as "C:\Windows\System32". Core operating system files are filtered, and only non-core-OS files will be captured. For example, in the case of the Windows operating system, this may mean that "Kernel32.dll" and "ntdll.dll" will not be captured, but "vccorlib120.dll" and "atl100. dll" will be captured.

Once all of the initial components have been detected and the binary executable files are parsed and the additional components indicated by the strings in the binaries have been gathered, most of the application components necessary for execution of the application have been captured. However, a number of useful components still remain.

COM Database Scanning 608—In one embodiment, the management agent scans the component object model (COM) database in the registry, searching for related COM records that are required by the application. If any such records are found, they are captured as well. This is performed by checking every COM record in the registry for reference to files which were previously captured (during Initial Component Detection 604 and Binary Executable Parsing 606). If any such reference is found, the entire COM record is captured, along with the relevant COM interface.

Shell Extension Scanning 610—In one embodiment, the management agent scans the shell extension references in the registry, looking for shell extensions which are based on already-captured files (i.e. files captured during the initial component detection 604 and binary executable parsing 606). If such shell extensions are found, they can also be collected.

Shortcut Capture 612—In some embodiments, the agent enumerates and parses all of the desktop and start menu shortcuts. The target of each shortcut is checked against the already captured files (i.e. files captured during the initial component detection 604 and binary executable parsing 606). If the agent detects a shortcut which points to an already-captured file, the shortcut is collected.

Once the static analysis has been completed, the application storage volume should contain all of the components that comprise the application. At this point, the application storage volume can be distributed to other endpoint devices and otherwise managed by the administrator. Additionally, in some embodiments, the management agent can be configured to perform dynamic monitoring 314 of the application after the static analysis has been completed.

Dynamic Monitoring 614—This method is designed to get as close as possible to the application's component closure. During this phase, the application is executed while monitoring all the files system and registry accesses of the application, including the sub-processes of the application. In one embodiment, the file system and registry access monitoring (as well as sub-processes and services monitoring) is implemented by the management agent listening and parsing kernel-events generated from Event Tracing for Windows (ETW), a framework built into the Windows operating system. Using ETW allows minimal intervention in the machine, since no dedicated installed driver is required. In an alternative embodiment, a kernel mode mini filter driver may also be used to monitor all relevant file system and registry access.

In various embodiments, dynamic monitoring 614 enables the agent to complete the detection of any components of the application which may have possibly been missed by the static analysis. Dynamic Monitoring can run in several different modes:

a. Hidden Mode—the application is executed in the background, hidden and with no user interaction. In this case, every collected desktop/start menu shortcut is started and monitored. The hidden mode is achieved by running the application under a different, dedicated, desktop environment. The application is running under newly created "clean" user. This allows mimicking the application behavior when the application is running for the first time.

b. Active Mode—the user can execute the application and use it, while dynamic monitoring only collects the file system and registry access by the application.

Based on the dynamic monitoring, the agent may be able to determine which components if any, the static analysis has missed. For example, if the agent detects that the application is making a call to a component that is not included in the application storage volume and that component is not a core operating system file that would normally be available on every endpoint, the agent may retrieve that component and add it to the application storage volume on the assumption that the component is part of the application.

In various embodiments, the management agent is able to remove the local copy of the application, therefore un-assigning the application, which will result with the application being completely removed from the machine. This is done by removing the application-specific components from the machine. For MSI applications, only non-shared component are removed, while shared component remain on the machine (to prevent breaking of other programs). If the application is removed in this manner, this means that the agent is effectively replacing the entire application with a managed version of the application by attaching the application storage volume to the device. This results in the potential for moving from any environment to an entirely managed one, giving the IT admin the power to control any and all of the software on the organizations' endpoints, while causing minimal/no interruption to end-users' productivity.

Figure 7:
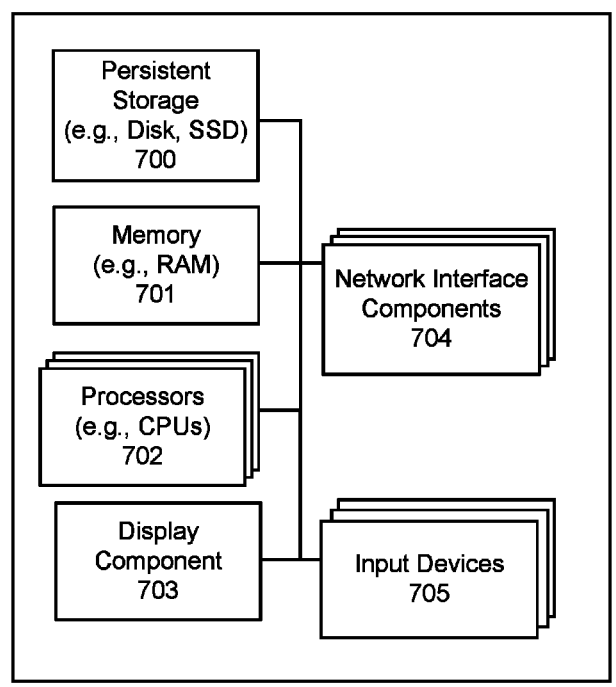
FIG. 7 illustrates an example of some general components of a computing device, in accordance with various embodiments.

FIG. 7 illustrates an example of some general components of a computing device, in accordance with various embodiments. In this particular example, the device includes one or more processors (e.g., central processing units (CPUs) 702 for executing instructions that can be stored in a storage medium component. The storage medium can include many types of memory, persistent data storage, or non-transitory computer-readable storage media. For example, the storage medium may take the form of random access memory (RAM) 701 storing program instructions for execution by the processor(s) 702, a persistent storage (e.g., disk or SSD) 700, a removable memory for sharing information with other devices and/or the like. The computing device typically can further comprise a display component 703, such as a monitor, a touch screen, liquid crystal display (LCD), or the like. In various embodiments, the computing device will include at least one input device 705 able to receive conventional input from a user. This conventional input can include, for example, a push button, touch pad, touch screen, wheel, joystick, keyboard, mouse, keypad, or any other such device or element whereby a user can input a command to the device. In some embodiments, the computing device can include a network interface component (NIC) 704 for communicating over various networks, such as a Wi-Fi, Bluetooth, RF, wired, or wireless communication systems. The device in many embodiments can communicate over a network, such as the Internet, and may be able to communicate with other devices connected to the same or other network.

Various embodiments described herein can be implemented in a wide variety of environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Many embodiments utilize at least one network that would be familiar to those skilled in the art for supporting communications using any of a variety of commercially-available protocols, such as TCP/IP, FTP, UDP or the like. The network can be, for example, a local area network, a wide-area network, a virtual private network, the Internet, an intranet, an extranet, a public switched telephone network, an infrared network, a wireless network, and any combination thereof.

The various environments in which the embodiments can be implemented may include a variety of data stores and other memory and storage media, as discussed above. These can reside in a variety of locations, such as on a storage medium local to one or more of the computers or remote from any or all of the computers across the network. In some embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method for segregating a monolithic computing system into multiple application containers, the method comprising:
performing a static analysis of a computing system having an operating system and a plurality of applications installed thereon to determine application boundaries, the static analysis including:
identifying a first set of components that comprise a first application of the plurality of applications including
inspecting an installation database on the computing system to determine a set of basic components of the first application installed on the computing system, the set of basic components including one or more binary executable files;
parsing the one or more binary executable files to identify character strings that indicate a file system path, a registry path, a file name or an imported module; and
capturing one or more additional components identified by the character strings parsed from the one or more binary executable files;
identifying a second set of components that comprise a second application of the plurality of applications;
generating a first virtual disk that contains the first set of components of the first application, including storing the set of basic components and the additional components in the first virtual disk; and
generating a second virtual disk that contains the second set of components of the second application.

2. The method of claim 1, further comprising:
deleting the first set of components of the first application from original locations on the computing system in which the set of components were stored during installation of the first application; and
attaching the first virtual disk by mounting the first virtual disk to the computing system and modifying one or more registry keys on the operating system to make the first application executable from the mounted first virtual disk.

3. The method of claim 2, wherein the first application is separated from the operating system and wherein the first application is executed by invoking the first set of components in the first virtual disk.

4. The method of claim 2, further comprising:
disabling the first application on the computing system by unmounting the first virtual disk.

5. The method of claim 1, further comprising:
uploading the first virtual disk containing the first application and the second virtual disk containing the second application to a management server over a network connection.

6. The method of claim 1, wherein the static analysis is performed by an agent operating on the computing system, the agent configured to communicate with a management server over a network connection to receive instructions for attaching or detach the first virtual disk.

7. A computing device, comprising:
at least one processor; and
memory including instructions that, when executed by the at least one processor, cause the computing device to:
perform a static analysis of a computing system having an operating system and a plurality of applications installed thereon to determine application boundaries, the static analysis including:
identify a first set of components that comprise a first application of the plurality of applications including
inspecting an installation database on the computing system to determine a set of basic components of the first application installed on the computing system, the set of basic components including one or more binary executable files;
parsing the one or more binary executable files to identify character strings that indicate a file system path, a registry path, a file name or an imported module; and
capturing one or more additional components identified by the character strings parsed from the one or more binary executable files;
identify a second set of components that comprise a second application of the plurality of applications;
generate a first virtual disk that contains the first set of components of the first application, including storing the set of basic components and the additional components in the first virtual disk; and
generate a second virtual disk that contains the second set of components of the second application.

8. The computing device of claim 7, wherein the memory further includes instructions that, when executed by the at least one processor, cause the computing device to:
delete the first set of components of the first application from original locations on the computing system in which the set of components were stored during installation of the first application; and
attach the first virtual disk by mounting the first virtual disk to the computing system and modifying one or more registry keys on the operating system to make the first application executable from the mounted first virtual disk.

9. The computing device of claim 8, wherein the first application is separated from the operating system and wherein the first application is executed by invoking the first set of components in the first virtual disk.

10. The computing device of claim 8, wherein the memory further includes instructions that, when executed by the at least one processor, cause the computing device to:
 disable the first application on the computing system by unmounting the first virtual disk.

11. The computing device of claim 7, wherein the memory further includes instructions that, when executed by the at least one processor, cause the computing device to:
 upload the first virtual disk containing the first application and the second virtual disk containing the second application to a management server over a network connection.

12. The computing device of claim 7, wherein the static analysis is performed by an agent operating on the computing system, the agent configured to communicate with a management server over a network connection to receive instructions for attaching or detach the first virtual disk.

13. A non-transitory computer readable storage medium comprising one or more sequences of instructions, the instructions when executed by one or more processors causing the one or more processors to execute the operations of:
 performing a static analysis of a computing system having an operating system and a plurality of applications installed thereon to determine application boundaries, the static analysis including:
  identifying a first set of components that comprise a first application of the plurality of applications including
   inspecting an installation database on the computing system to determine a set of basic components of the first application installed on the computing system, the set of basic components including one or more binary executable files;
   parsing the one or more binary executable files to identify character strings that indicate a file system path, a registry path, a file name or an imported module; and
   capturing one or more additional components identified by the character strings parsed from the one or more binary executable files;
  identifying a second set of components that comprise a second application of the plurality of applications;
 generating a first virtual disk that contains the first set of components of the first application, including storing the set of basic components and the additional components in the first virtual disk; and
 generating a second virtual disk that contains the second set of components of the second application.

14. The non-transitory computer readable storage medium of claim 13, further comprising instructions that when executed by one or more processors causing the one or more processors to execute the operations of:
 deleting the first set of components of the first application from original locations on the computing system in which the set of components were stored during installation of the first application; and
 attaching the first virtual disk by mounting the first virtual disk to the computing system and modifying one or more registry keys on the operating system to make the first application executable from the mounted first virtual disk.

15. The non-transitory computer readable storage medium of claim 14, wherein the first application is separated from the operating system and wherein the first application is executed by invoking the first set of components in the first virtual disk.

16. The non-transitory computer readable storage medium of claim 14, further comprising instructions that when executed by one or more processors causing the one or more processors to execute the operation of:
 disabling the first application on the computing system by unmounting the first virtual disk.

17. The non-transitory computer readable storage medium of claim 13, further comprising instructions that when executed by one or more processors causing the one or more processors to execute the operation of:
 uploading the first virtual disk containing the first application and the second virtual disk containing the second application to a management server over a network connection.

18. The non-transitory computer readable storage medium of claim 13, wherein the static analysis is performed by an agent operating on the computing system, the agent configured to communicate with a management server over a network connection to receive instructions for attaching or detach the first virtual disk.

* * * * *